Feb. 14, 1928.

W. N. ALLAN 1,659,508

LENS FOR HEADLIGHTS

Filed May 1, 1924

Inventor
William N. Allan

By James L. Norris
Attorney

Patented Feb. 14, 1928.

1,659,508

UNITED STATES PATENT OFFICE.

WILLIAM N. ALLAN, OF SAN ANTONIO, TEXAS.

LENS FOR HEADLIGHTS.

Application filed May 1, 1924. Serial No. 710,330.

This invention relates to headlights for automobiles and other analogous lighting devices.

The main object of the present invention is to provide a front glass or lens for a headlight or analogous lighting means of such constitution or character as to wholly eliminate the glare from a headlight by softening light rays or beams projected therethrough and depriving said rays of forceful or intense action on the eyes of the observer and which will at the same time throw a softened or diffused light ahead of the machine or automobile sufficient to illuminate a roadway and satisfy all of the purposes and requirements of headlight illumination.

A further essential object of the invention is to provide a lens for a headlight formed of a material having objectionable light ray or beam eliminating characteristics through the whole thickness of the lens, and thus at all times uniformly eliminate objectionable light rays making it possible to use a light source of materially greater candle power than is commonly permitted and employed in headlights.

The improved lens is neither fully opaque nor transparent, it having been found by experiment and practical tests that the softened projected light which is so desirable in headlight operations and service can be obtained by forming the lens of a material, preferably vitreous, of a milky character and of a predetermined thickness.

A still further object of the invention is to produce a lens for a headlight that will comply with the requirements of state laws that strong projected light rays or beams be eliminated and that at the same time sufficient light be projected in advance of the vehicle to illuminate the roadway.

With these and other objects and advantages in view, the invention consists in the preferred construction and arrangement of a lens or front light-emitting member for a headlight which will be more fully hereinafter described and claimed.

Figure 1:
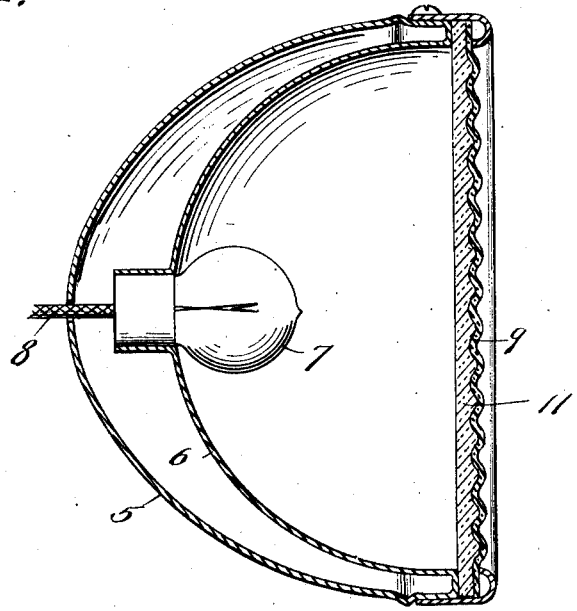
Fig. 1 is a longitudinal vertical section through a headlight, equipped with the improved lens or front light-emitting covering.
Figure 2:
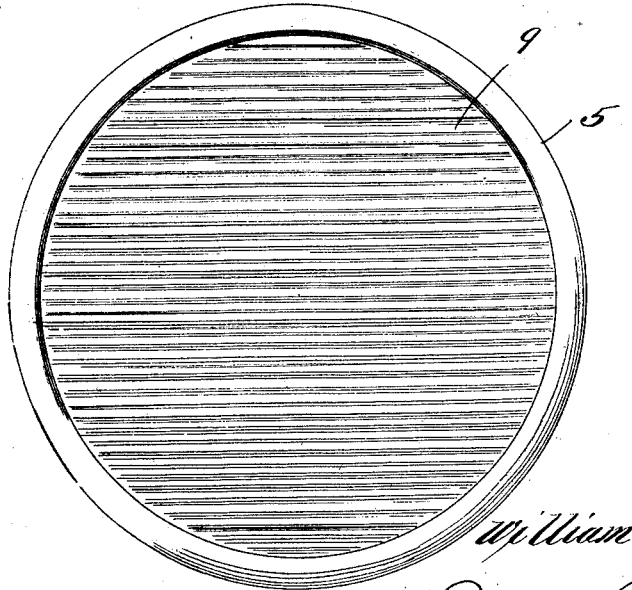
Fig. 2 is a front elevation of the headlight lens or light-emitting covering shown in Fig. 1.

The numeral 5 designates a headlight casing or enclosure of ordinary form having therein a reflector 6 of any suitable type and a source of light, consisting of an incandescent electric lamp 7 centrally disposed with relation to the reflector 6. The parts of the headlight thus far described may be varied in accordance with different types of devices of this character embodying the same essential features. The source of light or illumination consisting of the incandescent electric lamp 7 has a wire connection, as at 8, which will extend back to suitable switch means and a battery or other electrical generation source, as in ordinary headlight installations.

The lens consists of a plate 9 formed of a material which is uniformly translucent throughout its thickness and preferably of a vitreous character, so as to eliminate all objectionable glaring projected light rays or beams and which will diffuse or soften the light rays projected therethrough but yet permit sufficient illuminating projection to light a roadway or other area which the headlight is disposed to illuminate. It has been found by test and experiment that the improved headlight lens or light-emitting cover or means must have a body constitution of a certain character and be of a predetermined thickness to produce the softened non-glaring projected light desired, and it has also been found that the material of which it is made should be of a milky character which if thickened beyond a predetermined degree, would prevent the passage therethrough of much light of any sort, or would be too opaque to be serviceable as a light-emitting means. It has also been found that this plate 9, if made of the same material of less than a predetermined degree of thickness, it would permit the passage therethrough and in advance of same of light rays or beams of a glaring objectionable character. It has also been determined that various degrees of milkiness of the plate 9, or a variation in the density of the lens or light-emitting cover or means, will require a corresponding variation in the thickness of the said lens or cover. For all practical purposes, however, under ordinay conditions the plate 9 should be about one-thirty-second of an inch in thickness. This thickness, however, is specified simply as an illustration of one practical measurement and, as above noted, may be varied in accordance with the degree of milkiness of the material of which the lens or light-emitting cover or plate is formed. The plate 9 has horizontally-disposed corrugations and is reinforced or strengthened by a supporting plate 11 of a clear transparent material such as glass. The horizontal corrugations serve to concentrate the light in the roadway, and cause the softened light thrown in advance of the lens to assume a gradually diverging oval contour with the longest axis of the oval disposed vertically, so that the light cast ahead of the improved headlight will illuminate the roadway and any irregularities or dangerous places therein, and yet will not blind drivers of machines moving in opposite directions.

No matter in what position an automobile or machine may be, whether coming over the brow of a hill, descending a hill or on a level roadway, the desirable light cast ahead of a vehicle equipped with a headlight having the improved lines will always be the same and will comply with various State laws governing the use of headlights. Among the advantageous features of the improvement is its simplicity and low cost of production and application, its constancy of operation which would not be present in a similar device having a painted or other analogous surface, or consisting of an ordinary transparent glass lens having a painted outer surface or a ground surface, the painted and ground surfaces being always liable to vary and failing to cast illumination far enough ahead of the machine or automobile free of all projected glaring rays or beams. Furthermore, the improved lens or light-emitting cover or means, since it is held within the front portion of the casing of the headlight in a manner similar to the various types of lenses heretofore used is very superior to attached hoods, curtains and shields which are liable to get out of order and work loose and create an annoying or rattling noise after being in use a comparatively short time.

What is claimed as new is:

A lens for a headlight of the type embodying a casing, a reflector mounted in the casing, and a light source supported in cooperative relation to the reflector, said lens comprising a comparatively thin plate having a body mass composed of a milky material and reinforced by a transparent plate associated therewith, said plate and transparent reinforcing plate being formed with horizontally disposed corrugations to modify the light passing through the same and eliminate the projection of objectionable glaring light rays and to cast a light of approximately oval form with the long axis of the oval disposed vertically.

In testimony whereof I have hereunto set my hand.

WILLIAM N. ALLAN.